US006942329B2

(12) United States Patent
Soga et al.

(10) Patent No.: US 6,942,329 B2
(45) Date of Patent: Sep. 13, 2005

(54) INK FOR INKJET RECORDING, AND CARTRIDGE AND RECORDING APPARATUS INCLUDING THE INK

(75) Inventors: Mamoru Soga, Osaka (JP); Hidekazu Arase, Fukuoka (JP); Hiroyuki Matsuo, Osaka (JP); Masaichiro Tatekawa, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 71 days.

(21) Appl. No.: 10/468,207

(22) PCT Filed: Mar. 8, 2002

(86) PCT No.: PCT/JP02/02220

§ 371 (c)(1), (2), (4) Date: Aug. 18, 2003

(87) PCT Pub. No.: WO02/072719

PCT Pub. Date: Sep. 19, 2002

(65) Prior Publication Data

US 2004/0075725 A1 Apr. 22, 2004

(30) Foreign Application Priority Data

Mar. 8, 2001 (JP) ....................................... 2001-064473
Mar. 8, 2001 (JP) ....................................... 2001-064477
Sep. 25, 2001 (JP) ....................................... 2001-291002
Sep. 25, 2001 (JP) ....................................... 2001-291017

(51) Int. Cl.[7] ................................................... B41J 2/01
(52) U.S. Cl. ........................... 347/100; 347/86; 347/95; 523/160
(58) Field of Search ............................ 347/100, 95, 96, 347/86, 85, 98, 101; 523/160; 106/31.13, 31.27, 31.6

(56) References Cited

U.S. PATENT DOCUMENTS 5,100,470 A * 3/1992 Hindagolla et al. ......... 347/100
5,837,042 A * 11/1998 Lent et al. .................. 347/100
5,972,087 A * 10/1999 Uraki et al. ............. 106/31.65
6,264,730 B1 * 7/2001 Matsumura et al. ..... 106/31.43
6,538,047 B1 * 3/2003 Miyabayashi ............... 347/100

FOREIGN PATENT DOCUMENTS

EP 856566 A1 8/1998
EP 940456 A1 9/1999
EP 940456 A1 * 9/1999 ........... C09D/11/00
EP 1010739 A1 6/2000
JP 56-90866 A 7/1981
JP 10212439 A 8/1998
JP 11293167 A 10/1999
JP 11315231 A 11/1999

OTHER PUBLICATIONS

International Search Report for International Application No. PCT/JP02/02220, completion date May 29, 2002, ISA/JPO.

* cited by examiner

*Primary Examiner*—Manish Shah
(74) *Attorney, Agent, or Firm*—Harness, Dickey & Pierce, P.L.C.

(57) ABSTRACT

An ink for inkjet recording containing a colorant, a humectant, a penetrant, water and a water soluble substance that is condensation-polymerized in the absence of water (e.g., hydrolysable silane compound), a gelation suppressant is contained for suppressing gelation of the water soluble substance in the water, wherein gelation suppressant is acetylacetone or derivative thereof.

7 Claims, 3 Drawing Sheets

INK FOR INKJET RECORDING, AND CARTRIDGE AND RECORDING APPARATUS INCLUDING THE INK

TECHNICAL FIELD

The present invention falls within the technical field which relates to ink suitable for inkjet recording, and a cartridge and recording apparatus including the ink.

BACKGROUND ART

Conventionally, ink containing a colorant, such as a dye, a pigment, or the like, a humectant, a penetrant, and water has been well known as ink used for inkjet recording. However, in the case where an image is formed with the ink containing the colorant on a recording medium, such as recording paper, or the like, the water-resistivity of the image is a matter of concern. Especially when an image is recorded with ink containing a dye on plain paper, the water-resistivity of the image is very poor. (The "plain paper" herein refers to paper which is one of various types of commercially-available paper, which is especially used for an electrophotographic copying machine, and which is produced without an intention to have an optimum structure, composition, properties, or the like, for inkjet recording.)

As disclosed in Japanese Unexamined Patent Publication No. 10-212439, Japanese Unexamined Patent Publication No. 11-293167, and Japanese Unexamined Patent Publication No. 11-315231, adding a hydrolyzable silane compound (organic silicon compound) to ink in order to improve the water-resistivity of an image formed on a recording medium has been conventionally proposed. When a drop of the ink is adhered onto a recording medium, and a solvent contained in the ink drop, such as water, or the like, evaporates or permeates into the recording medium, the silane compound is condensation-polymerized, and this condensation-polymerized silane compound encloses a colorant. Thus, even when the image formed on the recording medium is exposed to water, the colorant does not exude into the water. That is, the water-resistivity of the image is improved.

However, such ink containing a hydrolyzable silane compound is poor in long-term preservability. In general, the ink containing a hydrolyzable silane compound is generally neutral (at about pH 7). If the ink continues to absorb carbon dioxide in the air over a long time period, the ink becomes acidic. When the ink becomes acidic in this way, the silane compound gradually turns into a gel in water by condensation-polymerization, or the like. Especially when the ink is preserved in a high temperature environment of about 70° C., gelation of the silane compound is more accelerated. In the case where the ink containing the gelled silane compound is used for recording, insufficient ejection of ink drops occurs due to an increase of the viscosity of the ink, and accordingly, the quality of an image deteriorates. Further, in the case where a certain amount of silane compound has undergone a reaction, when an ink drop is adhered onto a recording medium and water in the ink drop evaporates or permeates into the recording medium, the silane compound does not sufficiently enclose a colorant through condensation-polymerization, and the water-resistivity of an image formed on a recording medium also deteriorates.

The present invention was conceived in view of the above problems. An objective of the present invention is to suppress deterioration of the quality of an image and maintain the water-resistivity of the image at a high level even when ink containing a water-soluble substance that is condensation-polymerized in the absence of water, such as a hydrolyzable silane compound, is used for recording after being preserved for a long time.

DISCLOSURE OF INVENTION

According to the present invention, for the purpose of achieving the above objective, a gelation suppressant is contained in ink for suppressing gelation of the water-soluble substance in water, or the pH value of the ink is set to 8–12.

Specifically, the first invention is directed to ink for inkjet recording which contains a colorant, a humectant, a penetrant, water, and a water-soluble substance that is condensation-polymerized in the absence of the water, wherein the ink further contains a gelation suppressant for suppressing gelation of the water-soluble substance in the water.

With the above feature, the gelation suppressant suppresses gelation of the water-soluble substance in the water even when the ink becomes acidic due to absorption of carbon dioxide while the ink is preserved for a long time. As a result, condensation-polymerization of the water-soluble substance is suppressed, and an increase in the viscosity of the ink is suppressed. Therefore, even when the ink is used for recording after being preserved for a long time, no ejection failure of ink drops occurs. Further, when an ink drop is adhered onto a recording medium and water contained in the ink drop evaporates or permeates into the recording medium, the water-soluble substance is condensation-polymerized to enclose the colorant. Thus, even when the ink is used for recording after being preserved for a long time, deterioration of the image quality can be suppressed, and the water-resistivity of the image can be maintained at a high level.

According to the second invention, in the first invention, the water-soluble substance is a hydrolyzable silane compound.

The silane compound is very preferable in view of improvement of water-resistivity and enables efficient achievement of the effects of the first invention.

According to the third invention, in the second invention, the gelation suppressant is acetylacetone or a derivative thereof.

With the above feature, oxygen of the acetylacetone or derivative thereof is hydrogen-bonded to active portions of the silane compound, and accordingly, gelation of the silane compound can be surely suppressed. On the other hand, when an ink drop is adhered onto a recording medium and water contained in the ink drop evaporates or permeates into the recording medium, the hydrogen bond is separated. As a result, the acetylacetone or derivative thereof evaporates or permeates into the recording medium, and the silane compound surely undergoes condensation-polymerization. Thus, the acetylacetone or derivative thereof is optimum as the gelation suppressant.

According to the fourth invention, in the third invention, the acetylacetone derivative is an acetylacetonato complex or an acetylacetone derivative having a symmetry plane.

With the above feature, a derivative which is readily bonded to active portions of the silane compound is obtained. Especially the acetylacetone derivative having a symmetry plane is very much readily bonded to the active portions of the silane compound because the active portions of the silane compound are aligned in a line in normal state.

According to the fifth invention, in the second invention, the content of the gelation suppressant is set to 0.1–30% by mass with respect to the content of the hydrolyzable silane compound.

If the content of the gelation suppressant is smaller than 0.1% with respect to the content of the silane compound, gelation of the silane compound is not sufficiently suppressed. If the content of the gelation suppressant is greater than 30% with respect to the content of the silane compound, condensation-polymerization of the silane compound, which occurs when an ink drop is adhered onto a recording medium and water contained in the ink drop evaporates or permeates into the recording medium, is readily inhibited by the gelation suppressant. For such reasons, the content of the gelation suppressant is set to 0.1–30% by mass with respect to the content of the hydrolyzable silane compound. Thus, with this invention, extremely high water-resistivity can be maintained over a long time period.

The sixth invention is directed to ink for inkjet recording which contains a colorant, a humectant, a penetrant, water, and a water-soluble substance that is condensation-polymerized in the absence of the water, wherein the pH value of the ink is set to 8–12.

If the pH value of the ink is smaller than 8, the ink absorbs carbon dioxide to become acidic while the ink is preserved for a long time. As a result, the water-soluble substance readily turns into a gel in water. If the pH value of the ink is higher than 12, resin and metal materials which form elements of a recording apparatus, e.g., an ink-jet head which ejects the ink toward a recording medium, or the like, are corroded or degraded. For such reasons, the pH value of the ink is set to 8–12. Thus, by setting the pH value of the ink to 8–12, the ink is prevented from becoming acidic after a long preservation period, and gelation of the ink is suppressed, while corrosion and degradation of the resin and metal materials which form an inkjet head, or the like, are suppressed. As a result, even if the ink is used for recording after being preserved for a long time, ejection failure of ink drops does not occur. Further, when a drop of the ink is adhered onto a recording medium and water contained in the ink drop evaporates or permeates into the recording medium, the condensation-polymerized water-soluble substance encloses the colorant. Therefore, as in the first invention, even when the ink is used for recording after being preserved for a long time, deterioration of the image quality can be suppressed, and the water-resistivity of the image can be maintained at a high level.

According to the seventh invention, in the sixth invention, the water-soluble substance is a hydrolyzable silane compound. With this feature, the effects of the sixth invention are efficiently achieved.

According to the eighth invention, in the sixth invention, the pH value of the ink is set to 8–12 by adding an inorganic alkali or an organic base.

In this way, the pH value of the ink can readily be set to 8–12, and in addition, a buffer solution which prevents a change in the pH value of the ink even when the ink absorbs carbon dioxide can be obtained.

The ninth invention is directed to a cartridge including ink for inkjet recording. The ink contains a colorant, a humectant, a penetrant, water, and a water-soluble substance that is condensation-polymerized in the absence of the water. In this invention, the ink further contains a gelation suppressant for suppressing gelation of the water-soluble substance in the water.

This invention achieves the same effects as those of the first invention.

The tenth invention is directed to a cartridge including ink for inkjet recording. The ink contains a colorant, a humectant, a penetrant, water, and a water-soluble substance that is condensation-polymerized in the absence of the water. The pH value of the ink is set to 8–12.

This invention achieves the same effects as those of the sixth invention.

The eleventh invention is directed to a recording apparatus including ink for inkjet recording. The ink contains a colorant, a humectant, a penetrant, water, and a water-soluble substance that is condensation-polymerized in the absence of the water. The recording apparatus ejects the ink toward a recording medium for recording. In this invention, the ink further contains a gelation suppressant for suppressing gelation of the water-soluble substance in the water.

This invention achieves the same effects as those of the first invention.

The twelfth invention is directed to a recording apparatus including ink for inkjet recording. The ink contains a colorant, a humectant, a penetrant, water, and a water-soluble substance that is condensation-polymerized in the absence of the water. The recording apparatus ejects the ink toward a recording medium for recording. The pH value of the ink is set to 8–12.

This invention achieves the same effects as those of the sixth invention.

BEST MODE FOR CARRYING OUT THE INVENTION

Figure 1:
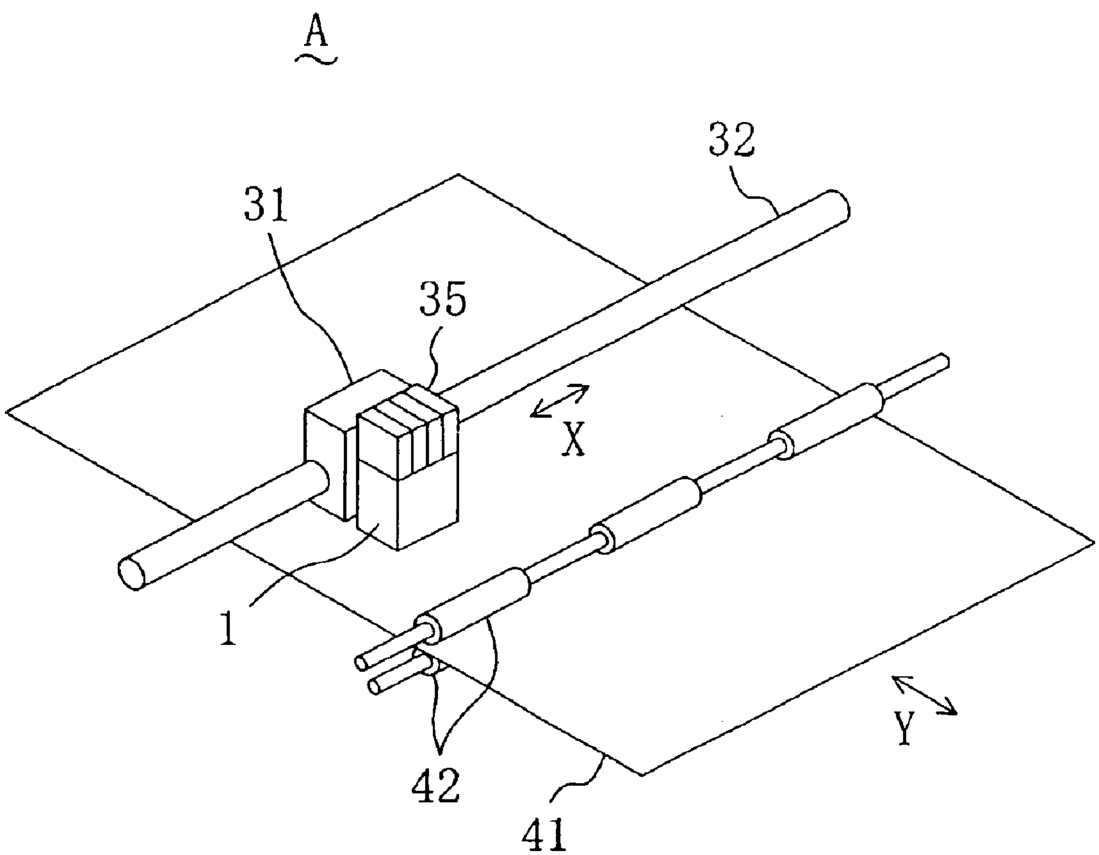
FIG. 1 is a general perspective view showing an inkjet-type recording apparatus including ink for inkjet recording according to an embodiment of the present invention.

FIG. 1 generally shows an inkjet-type recording apparatus A including ink for inkjet recording according to an embodiment of the present invention. The recording apparatus A has an inkjet head 1. An ink cartridge 35 including ink is attached onto the upper surface of the inkjet head 1. The inkjet head 1 ejects the ink onto recording paper 41 employed as a recording medium in a manner described later. The inkjet head 1 is fixedly supported by a carriage 31. The carriage 31 is provided with a carriage motor (not shown). The inkjet head 1 and the carriage 31 are reciprocated along the primary scanning direction (X direction in FIGS. 1 and 2) by the carriage motor while being guided by a carriage shaft 32 which extends along the primary scanning direction. The carriage 31, the carriage shaft 32 and the carriage motor constitute relative movement means for relatively moving the inkjet head 1 and the recording paper 41 along the primary scanning direction.

The ink cartridge 35 is a container which contains the ink. The ink cartridge 35 is structured so as to be detachable from the inkjet head 1. When the ink in the container is exhausted, the ink cartridge 35 can be replaced by a new one.

The recording paper 41 is sandwiched by two transfer rollers 42 which are rotated by a transfer motor (not shown). Under the inkjet head 1, the recording paper 41 is transferred by the transfer motor and transfer rollers 42 along the secondary scanning direction (Y direction in FIGS. 1 and 2) which is perpendicular to the primary scanning direction. The transfer motor and transfer rollers 42 constitute relative movement means for relatively moving the inkjet head 1 and the recording paper 41 along the secondary scanning direction.

Figure 2:
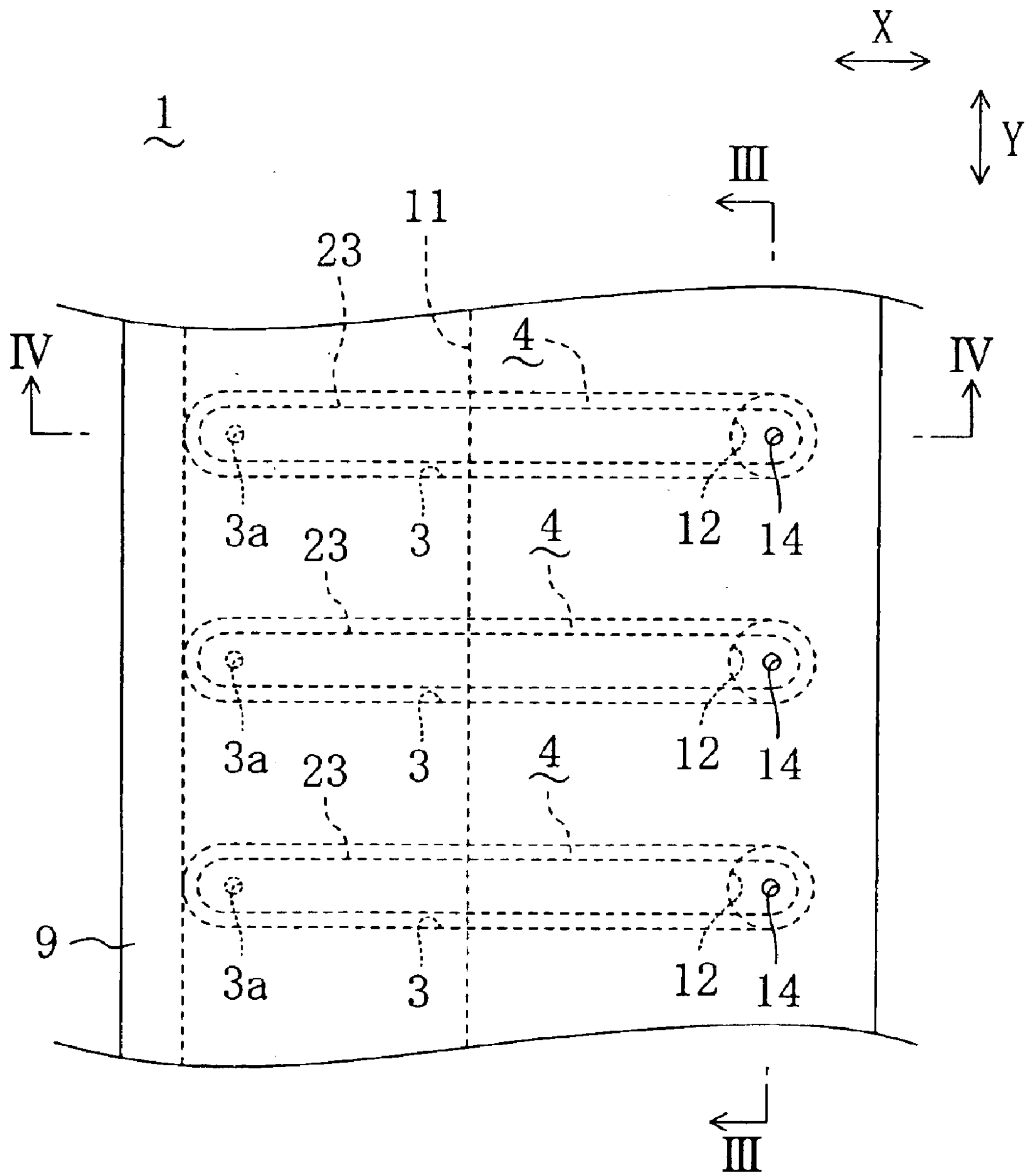
FIG. 2 shows a portion of a bottom surface of an inkjet head of the inkjet-type recording apparatus.
Figure 3:
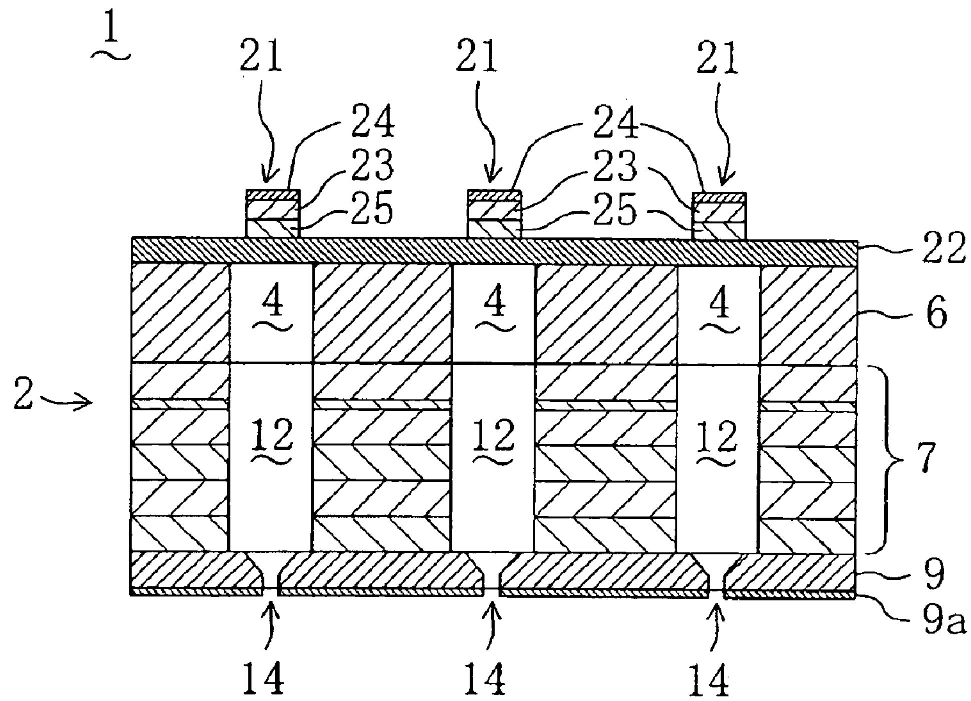
FIG. 3 is a cross-sectional view taken along line III—III of FIG. 2.
Figure 4:
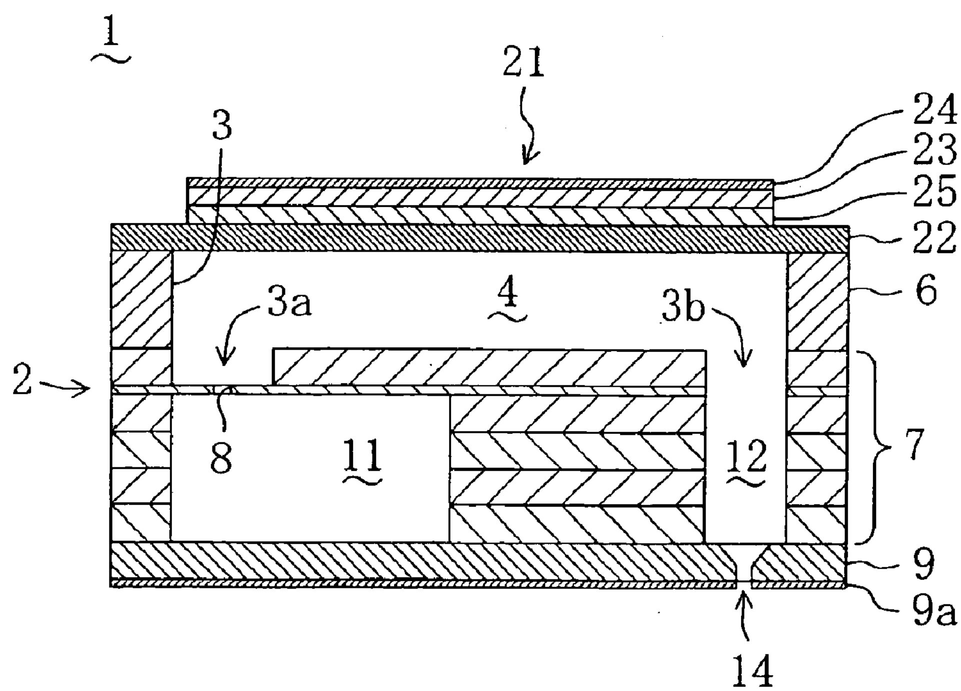
FIG. 4 is a cross-sectional view taken along line IV—IV of FIG. 2.

Referring to FIGS. 2 through 4, the inkjet head 1 includes a head body 2. The head body 2 includes a plurality of concaved portions 3 for pressure chambers. Each of the concaved portions 3 has a supply hole 3*a* for supplying ink and an ejection hole 3*b* for ejecting the ink. The concaved portions 3 of the head body 2 are opened in the upper surface of the head body 2 such that the openings extend along the primary scanning direction, and arranged along the secondary scanning direction with generally-equal intervals therebetween. The length of the opening of each concaved portion 3 is set to about 1250 μm, and the width thereof is set to about 130 μm. Opposite ends of the opening of each concaved portion 3 have a generally-semicircular shape.

A side wall of each concaved portion 3 of the head body 2 is formed by a pressure chamber member 6 made of photosensitive glass having a thickness of about 200 μm. A bottom wall of each concaved portion 3 is formed by an ink passage member 7 which is adhesively fixed onto the lower surface of the pressure chamber member 6. The ink passage member 7 is a laminate of six thin plates of stainless steel. The ink passage member 7 has a plurality of orifices 8, one ink supply passage 11, and a plurality of ink ejection passages 12. Each of the orifices 8 is connected to the supply hole 3*a* of a corresponding one of the concaved portions 3. The ink supply passage 11 is connected to the orifices 8 and extends along the secondary scanning direction. Each of the ink ejection passages 12 is connected to the ejection hole 3*b* of a corresponding one of the concaved portions 3.

Each orifice 8 is formed in the second thin plate of stainless steel from the top of the ink passage member 7. The thickness of the second thin plate is smaller than those of the other thin plates. The diameter of the orifice 8 is set to about 38 μm. The ink supply passage 11 is connected to the ink cartridge 35, such that the ink is supplied from the ink cartridge 35 into the ink supply passage 11.

A nozzle plate 9 made of stainless steel is adhesively fixed onto the lower surface of the ink passage member 7. The nozzle plate 9 has a plurality of nozzles 14 for ejecting ink drops toward the recording paper 41. The lower surface of the nozzle plate 9 is covered with a water-repulsive film 9*a*. The nozzles 14 are connected to the ink ejection passages 12 so as to have a communication with the ejection holes 3*b* of the concaved portions 3 through the ink ejection passages 12. The nozzles 14 are aligned in a row on the lower surface of the inkjet head 1 along the secondary scanning direction. Each nozzle 14 includes a tapered portion, where the nozzle diameter gradually decreases along a direction toward a nozzle tip side, and a straight portion provided at the nozzle tip side of the tapered portion. The nozzle diameter of the straight portion is set to about 20 μm.

Piezoelectric actuators 21 are provided above the concaved portions 3 of the head body 2. The piezoelectric actuators 21 have a diaphragm 22 made of Cr. The diaphragm 22 is adhesively fixed onto the upper surface of the head body 2 so as to cover the concaved portions 3 of the head body 2. The diaphragm 22 and the concaved portions 3 form pressure chambers 4. The diaphragm 22 is a single element which is commonly used for all of the actuators 21. The diaphragm 22 also functions as a common electrode which is commonly used for all of piezoelectric elements 23 (described later).

Each piezoelectric actuator 21 has a piezoelectric element 23 made of lead zirconate titanate (PZT) and an individual electrode 24 made of Pt. On a surface of the diaphragm 22 which is opposite to the pressure chamber 4 (i.e., the upper surface of the diaphragm 22), the piezoelectric element 23 is provided at a portion of the surface which corresponds to the pressure chamber 4 (a portion above the opening of the concaved portion 3) with an intermediate layer 25 made of Cu interposed between the diaphragm 22 and the piezoelectric element 23. The individual electrode 24 is provided on a surface of the piezoelectric element 23 which is opposite to the diaphragm 22 (i.e., the upper surface of the piezoelectric element 23). The individual electrode 24 functions together with the diaphragm 22 to apply a voltage (driving voltage) to each piezoelectric element 23.

All of the diaphragm 22, the piezoelectric elements 23, the individual electrodes 24 and the intermediate layers 25 are formed of thin films. The thickness of the diaphragm 22 is set to about 6 μm. The thickness of each piezoelectric element 23 is set to 8 μm or smaller (e.g., about 3 μm). The thickness of each individual electrode 24 is set to about 0.2 μm. The thickness of each intermediate layer 25 is set to about 3 μm.

Each piezoelectric actuator 21 deforms a portion of the diaphragm 22 which corresponds to the pressure chamber 4 by applying a driving voltage to the piezoelectric element 23 through the diaphragm 22 or the intermediate layer 25 and the individual electrode 24, whereby the ink in the pressure chamber 4 is ejected from the ejection hole 3*b* or the nozzle 14. That is, when a pulse-shaped voltage is applied between the diaphragm 22 and the individual electrode 24, the piezoelectric element 23 shrinks along the width direction of the piezoelectric element 23, which is perpendicular to the thickness direction thereof, in response to a rising edge of the pulse voltage because of a piezoelectric effect. On the other hand, the diaphragm 22, the individual electrode 24 and the intermediate layer 25 do not shrink. As a result, a portion of the diaphragm 22 which corresponds to the pressure chamber 4 is flexibly deformed into the shape of a convex toward the pressure chamber 4 because of a so-called bimetal effect. This flexible deformation produces a pressure in the pressure chamber 4, and because of this pressure, the ink in the pressure chamber 4 is extruded out of the nozzle 14 through the ejection hole 3*b* and the ink ejection passages 12. Then, the piezoelectric element 23 expands in response to a falling edge of the pulse voltage so that the portion of the diaphragm 22 which corresponds to the pressure chamber 4 recovers its original shape. At this time, the ink extruded out of the nozzle 14 is separated from the ink remaining in the ink ejection passage 12, whereby the separated ink is released as an ink drop of, e.g., 3 pl, toward the recording paper 41. The released ink drop adheres onto the recording paper 41 in the form of a dot. On the other hand, when the diaphragm 22 flexibly deformed in the shape of a convex recovers its original shape, the pressure chamber 4 is charged with the ink which is supplied from the ink cartridge 35 through the ink supply passage 11 and the supply hole 3*a*. The pulse voltage applied to the piezoelectric elements 23 is not limited to the voltage of push-up/pull-down type as described above, but may be a voltage of pull-down/push-up type which falls from the first voltage to the second voltage that is lower than the first voltage and then rises to the first voltage.

The application of the driving voltage to each piezoelectric element 23 is performed at a predetermined time interval (for example, about 50 μm: driving frequency=20 kHz) while the inkjet head 1 and the carriage 31 are moved from one edge to the other edge of the recording paper 41 at a generally uniform speed along the primary scanning direction. It should be noted, however, that the voltage is not applied when the inkjet head 1 resides above a portion of the recording paper 41 where an ink drop is not to be placed. In this way, an ink drop is placed at a predetermined position. After recording of one scanning cycle is completed, the recording paper 41 is transferred for a predetermined distance along the secondary scanning direction by the transfer motor and the transfer rollers 42. Then, ink drops are ejected again while the inkjet head 1 and the carriage 31 are moved along the primary scanning direction, whereby recording of another one scanning cycle is performed. This operation is repeated until a desired image is formed over the recording paper 41.

Next, the ink used in the recording apparatus A is described in detail in embodiments 1 and 2 below.

Embodiment 1

The ink of embodiment 1 contains a colorant, a humectant for suppressing drying of the ink in the nozzle 14 of the inkjet head 1, or the like, a penetrant for enhancing the permeability of the ink into the recording paper 41, water, a hydrolyzable silane compound employed as a water-soluble substance that is condensation-polymerized in the absence of the water, and a gelation suppressant for suppressing gelation of the silane compound in the water.

When an ink drop ejected from the nozzle 14 of the inkjet head 1 is adhered onto the recording paper 41 and water contained in the ink drop evaporates or permeates into the recording paper 41, the silane compound is condensation-polymerized to enclose a colorant. As a result, even when an image formed by the ink drop on the recording paper 41 is exposed to water, the colorant is prevented from exuding into the water. In this way, the silane compound improves the water-resistivity of the image. A preferable silane compound is a reaction product of hydrolysis of alkoxysilane containing an organic group that has an amino group and alkoxysilane not containing an amino group. Another preferable silane compound is an organic silicon compound obtained by hydrolysis of a hydrolyzable silane that is produced by reacting an organic monoepoxy compound with a hydrolyzable silane having an amino group and a hydrolyzable silane not containing a nitrogen atom.

The colorant is desirably a dye or a pigment. The dye may be any type of dye but is preferably a water-soluble acid dye or direct dye.

Preferable pigments are shown below. For example, preferable black pigments include carbon black whose surface is treated with a diazonium salt and carbon black whose surface is treated by graft polymerization of a polymer. Preferable color pigments include a pigment treated with a surface active agent, such as a formalin condensation product of naphthalene sulfonate, lignin sulfonic acid, dioctylsulfosuccinate, polyoxyethylene alkylamine, aliphatic acid ester, or the like. Specific examples of color pigments are shown below. Examples of preferable cyan pigments include Pigment Blue 15:3, Pigment Blue 15:4, and aluminum phthalocyanine. Examples of preferable magenta pigments include Pigment Red 122 and Pigment Violet 19. Examples of preferable yellow pigments include Pigment Yellow 74, Pigment Yellow 109, Pigment Yellow 110, and Pigment Yellow 128.

The humectant is desirably a polyhydric alcohol, such as glycerol, or the like, or a water-soluble nitrogen heterocyclic compound, such as 2-pyrrolidone, and N-methyl-2-pyrrolidone.

The penetrant is preferably monoalkylether of polyhydric alcohol, such as diethyleneglycol monobutylether, or the like. The content of the penetrant is preferably 1–50% by mass with respect to the total amount of the ink. This is because if the content of the penetrant is smaller than 1%, an effect of allowing the ink to permeate into the recording paper 41 is not sufficiently obtained. On the other hand, if the content of the penetrant is greater than 50%, the solubility of the colorant and the silane compound to water decreases.

The gelation suppressant suppresses gradual gelation (polymerization) of the silane compound in water which may be caused due to condensation-polymerization, or the like. The gelation suppressant is desirably acetylacetone (see Chemical Formula 1) or a derivative thereof. The acetylacetone derivative is preferably an acetylacetonato complex or an acetylacetone derivative having a symmetry plane.

Chemical Formula 1

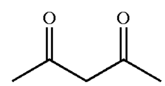

Specific examples of the acetylacetonato complex include $Al(AcAc)_3$, $Cu(AcAc)_2$, $Zr(AcAc)_4$, and the like.

Specific examples of the acetylacetone derivative having a symmetry plane include 3-methylpentane-2,4-dione (see Chemical Formula 2), heptane-3,5-dione (see Chemical Formula 3), 4-methylheptane-3,5-dione (see Chemical Formula 4), dimethylester malonate (see Chemical Formula 5), 2-dimethylester methylmalonate (see Chemical Formula 6), diethylester malonate (see Chemical Formula 7), 2-diethylester methylmalonate (see Chemical Formula 8), etc.

Chemical Formula 2

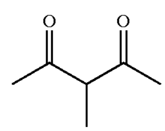

Chemical Formula 3

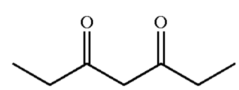

Chemical Formula 4

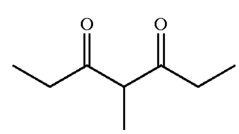

Chemical Formula 5

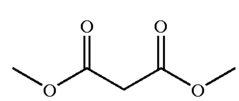

Chemical Formula 6

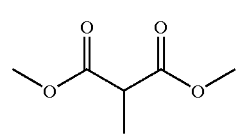

Chemical Formula 7

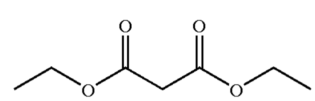

-continued

Chemical Formula 8

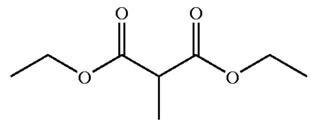

The acetylacetone or derivative thereof suppresses gelation of the silane compound because oxygen of the acetylacetone or derivative thereof is hydrogen-bonded to active portions of the silane compound (especially oxygen of the acetylacetone derivative is very much readily bonded to the active portions of the silane compound because the active portions of the silane compound are aligned in a line in normal state). On the other hand, when an ink drop is adhered onto the recording paper 41 and water contained in the ink drop evaporates or permeates into the recording paper 41, the hydrogen bond is separated so that the acetylacetone or derivative thereof evaporates or permeates into the recording paper 41. As a result, the silane compound is condensation-polymerized to enclose the colorant.

The content of the gelation suppressant is desirably set to 0.1–30% by mass with respect to the content of the silane compound. This is because if the content of the gelation suppressant is smaller than 0.1%, gelation of the silane compound is not sufficiently suppressed. If the content of the gelation suppressant is greater than 30%, when an ink drop is adhered onto the recording paper 41 and water contained in the ink drop evaporates or permeates into the recording paper 41, condensation-polymerization of the silane compound is more readily inhibited by the gelation suppressant. Considering that an effect of suppressing gelation of the silane compound without inhibiting condensation-polymerization on the recording paper 41 should be obtained more surely, a more preferable range of the content of the gelation suppressant is 0.5–20% by mass with respect to the content of the silane compound.

Thus, in embodiment 1, ink for inkjet recording contains a colorant, a humectant, a penetrant, water, a hydrolyzable silane compound that is condensation-polymerized in the absence of water, and a gelation suppressant for suppressing gelation of the silane compound in water, such as acetylacetone or a derivative thereof. Therefore, even when the ink becomes acidic due to absorption of carbon dioxide while the ink is preserved for a long time, gelation of the silane compound is suppressed by the gelation suppressant. Thus, the viscosity of the ink does not increase, and the ink is maintained to be stable over a long time period. As a result, ejection failure of ink drops does not occur even when the ink is used to form an image on the recording paper 41 with the recording apparatus A after being preserved for a long time, or even when the recording apparatus A is used after a long unused period where the pressure chamber 4 and the ink supply passage 11 of the head body 2 of the inkjet head 1 of the recording apparatus A is filled with the ink. Further, when an ink drop is adhered onto the recording paper 41 and water contained in the ink drop evaporates or permeates into the recording paper 41, condensation-polymerization of the silane compound is sufficiently performed so that the silane compound surely encloses the colorant. Thus, deterioration of the image quality can be suppressed and the water-resistivity of the image can be maintained at a high level over a long time period.

In embodiment 1, a hydrolytic silane compound is contained in the ink as the water-soluble substance that is condensation-polymerized in the absence of water. However, any type of substance may be used so long as the substance is condensation-polymerized to enclose a colorant when water contained in an ink drop which is ejected from the nozzle 14 of the inkjet head 1 and adhered onto the recording paper 41 evaporates or permeates into the recording paper 41. The substance having such a characteristic gradually changes into a gel in water as does the silane compound, i.e., has poor long-term preservability. Thus, the present invention is applicable to such a substance. That is, it is only necessary to add an appropriate gelation suppressant to the ink for suppressing gelation of the water-soluble substance in water.

Now, specific examples of the ink of embodiment 1 are described.

First, 28 types of ink for inkjet recording, which have the following compositions, were prepared (Examples 1–28). (It should be noted that the contents of the constituents of each composition are shown in percentage by mass. The parenthesized value for the content of the gelation suppressant represents the content of the gelation suppressant with respect to the content of the silane compound.)

In all of Examples 1–28, glycerol is used as the humectant, and diethyleneglycol monobutylether is used as the penetrant. Further, an organic silicon compound is used as the hydrolyzable silane compound. The organic silicon compound was obtained as follows. A mixture of 100 g (0.56 mol) of $H_2NCH_2CH_2CH_2Si(OCH_3)_3$ and 166 g (1.1 mol) of $Si(OCH_3)_4$ was added to 180 g (10 mol) of water contained in a reactor in a drop-by-drop fashion at room temperature. After all of the mixture was dropped into the water, the resultant solution was stirred for one hour at 60° C., whereby the organic silicon compound (hereinafter, "organic silicon compound (A)") was obtained.

Compounds represented by Chemical Formulae 1–8 are contained as the gelation suppressant. In Examples 11–20, acetylacetone is contained as the gelation suppressant in different amounts.

In each of Examples 1–23, a dye is contained as the colorant. In each of Examples 24–28, a pigment is contained as the colorant. In Examples 24–28, $Al(AcAc)_3$ is contained as the gelation suppressant.

EXAMPLE 1

| | |
|---|---|
| C.I. acid black 2 | 5% |
| glycerol | 10% |
| diethyleneglycol monobutylether | 10% |
| organic silicon compound (A) | 5% |
| $Al(AcAc)_3$ | 0.5% (10%) |
| pure water | 69.5% |

EXAMPLE 2

| | |
|---|---|
| C.I. acid black 2 | 5% |
| glycerol | 10% |
| diethyleneglycol monobutylether | 10% |
| organic silicon compound (A) | 5% |
| $Cu(AcAc)_2$ | 0.5% (10%) |
| pure water | 69.5% |

EXAMPLE 3

| | |
|---|---|
| C.I. acid black 2 | 5% |
| glycerol | 10% |
| diethyleneglycol monobutylether | 10% |
| organic silicon compound (A) | 5% |
| $Zr(AcAc)_4$ | 0.5% (10%) |
| pure water | 69.5% |

EXAMPLE 4

| | |
|---|---|
| C.I. acid black 2 | 5% |
| glycerol | 10% |
| diethyleneglycol monobutylether | 10% |
| organic silicon compound (A) | 5% |
| 3-methylpentane-2,4-dione | 0.5% (10%) |
| pure water | 69.5% |

EXAMPLE 5

| | |
|---|---|
| C.I. acid black 2 | 5% |
| glycerol | 10% |
| diethyleneglycol monobutylether | 10% |
| organic silicon compound (A) | 5% |
| heptane-3,5-dione | 0.5% (10%) |
| pure water | 69.5% |

EXAMPLE 6

| | |
|---|---|
| C.I. acid black 2 | 5% |
| glycerol | 10% |
| diethyleneglycol monobutylether | 10% |
| organic silicon compound (A) | 5% |
| 4-methylheptane-3,5-dione | 0.5% (10%) |
| pure water | 69.5% |

EXAMPLE 7

| | |
|---|---|
| C.I. acid black 2 | 5% |
| glycerol | 10% |
| diethyleneglycol monobutylether | 10% |
| organic silicon compound (A) | 5% |
| dimethylester malonate | 0.5% (10%) |
| pure water | 69.5% |

EXAMPLE 8

| | |
|---|---|
| C.I. acid black 2 | 5% |
| glycerol | 10% |
| diethyleneglycol monobutylether | 10% |
| organic silicon compound (A) | 5% |

-continued

| | |
|---|---|
| 2-dimethylester methylmalonate | 0.5% (10%) |
| pure water | 69.5% |

EXAMPLE 9

| | |
|---|---|
| C.I. acid black 2 | 5% |
| glycerol | 10% |
| diethyleneglycol monobutylether | 10% |
| organic silicon compound (A) | 5% |
| diethylester malonate | 0.5% (10%) |
| pure water | 69.5% |

EXAMPLE 10

| | |
|---|---|
| C.I. acid black 2 | 5% |
| glycerol | 10% |
| diethyleneglycol monobutylether | 10% |
| organic silicon compound (A) | 5% |
| 2-diethylester methylmalonate | 0.5% (10%) |
| pure water | 69.5% |

EXAMPLE 11

| | |
|---|---|
| C.I. acid black 2 | 5% |
| glycerol | 10% |
| diethyleneglycol monobutylether | 10% |
| organic silicon compound (A) | 5% |
| acetylacetone | 0.0025% (0.05%) |
| pure water | 69.9975% |

EXAMPLE 12

| | |
|---|---|
| C.I. acid black 2 | 5% |
| glycerol | 10% |
| diethyleneglycol monobutylether | 10% |
| organic silicon compound (A) | 5% |
| acetylacetone | 0.005% (0.1%) |
| pure water | 69.995% |

EXAMPLE 13

| | |
|---|---|
| C.I. acid black 2 | 5% |
| glycerol | 10% |
| diethyleneglycol monobutylether | 10% |
| organic silicon compound (A) | 5% |
| acetylacetone | 0.025% (0.5%) |
| pure water | 69.975% |

EXAMPLE 14

| | |
|---|---|
| C.I. acid black 2 | 5% |
| glycerol | 10% |
| diethyleneglycol monobutylether | 10% |
| organic silicon compound (A) | 5% |
| acetylacetone | 0.1% |
| | (2%) |
| pure water | 69.9% |

EXAMPLE 15

| | |
|---|---|
| C.I. acid black 2 | 5% |
| glycerol | 10% |
| diethyleneglycol monobutylether | 10% |
| organic silicon compound (A) | 5% |
| acetylacetone | 0.25% |
| | (5%) |
| pure water | 69.75% |

EXAMPLE 16

| | |
|---|---|
| C.I. acid black 2 | 5% |
| glycerol | 10% |
| diethyleneglycol monobutylether | 10% |
| organic silicon compound (A) | 5% |
| acetylacetone | 0.5% |
| | (10%) |
| pure water | 69.5% |

EXAMPLE 17

| | |
|---|---|
| C.I. acid black 2 | 5% |
| glycerol | 10% |
| diethyleneglycol monobutylether | 10% |
| organic silicon compound (A) | 5% |
| acetylacetone | 1% |
| | (20%) |
| pure water | 69% |

EXAMPLE 18

| | |
|---|---|
| C.I. acid black 2 | 5% |
| glycerol | 10% |
| diethyleneglycol monobutylether | 10% |
| organic silicon compound (A) | 5% |
| acetylacetone | 1.5% |
| | (30%) |
| pure water | 68.5% |

EXAMPLE 19

| | |
|---|---|
| C.I. acid black 2 | 5% |
| glycerol | 10% |
| diethyleneglycol monobutylether | 10% |
| organic silicon compound (A) | 5% |
| acetylacetone | 2% |
| | (40%) |
| pure water | 68% |

EXAMPLE 20

| | |
|---|---|
| C.I. acid black 2 | 5% |
| glycerol | 10% |
| diethyleneglycol monobutylether | 10% |
| organic silicon compound (A) | 5% |
| acetylacetone | 5% |
| | (100%) |
| pure water | 65% |

EXAMPLE 21

| | |
|---|---|
| C.I. acid yellow 23 | 5% |
| glycerol | 10% |
| diethyleneglycol monobutylether | 10% |
| organic silicon compound (A) | 5% |
| $Al(AcAc)_3$ | 0.5% |
| | (10%) |
| pure water | 69.5% |

EXAMPLE 22

| | |
|---|---|
| C.I. acid red 52 | 5% |
| glycerol | 10% |
| diethyleneglycol monobutylether | 10% |
| organic silicon compound (A) | 5% |
| $Al(AcAc)_3$ | 0.5% |
| | (10%) |
| pure water | 69.5% |

EXAMPLE 23

| | |
|---|---|
| C.I. direct blue 86 | 5% |
| glycerol | 10% |
| diethyleneglycol monobutylether | 10% |
| organic silicon compound (A) | 5% |
| $Al(AcAc)_3$ | 0.5% |
| | (10%) |
| pure water | 69.5% |

EXAMPLE 24

| | |
|---|---|
| carbon black (product name: CAB-O-JETTM-200; produced by Cabot Co.) | 5% |
| glycerol | 10% |
| diethyleneglycol monobutylether | 10% |
| organic silicon compound (A) | 5% |
| $Al(AcAc)_3$ | 0.5% |
| | (10%) |
| pure water | 69.5% |

EXAMPLE 25

| | |
|---|---|
| carbon black (product name: CAB-O-JETTM-300; produced by Cabot Co.) | 5% |
| glycerol | 10% |
| diethyleneglycol monobutylether | 10% |
| organic silicon compound (A) | 5% |
| $Al(AcAc)_3$ | 0.5% (10%) |
| pure water | 69.5% |

EXAMPLE 26

| | |
|---|---|
| yellow pigment (product name: FUJI SP YELLOW 4223; produced by FUJI SHIKISO Co.) | 5% |
| glycerol | 10% |
| diethyleneglycol monobutylether | 10% |
| organic silicon compound (A) | 5% |
| $Al(AcAc)_3$ | 0.5% (10%) |
| pure water | 69.5% |

EXAMPLE 27

| | |
|---|---|
| magenta pigment (product name: FUJI SP MAGENTA 9338; produced by FUJI SHIKISO Co.) | 5% |
| glycerol | 10% |
| diethyleneglycol monobutylether | 10% |
| organic silicon compound (A) | 5% |
| $Al(AcAc)_3$ | 0.5% (10%) |
| pure water | 69.5% |

EXAMPLE 28

| | |
|---|---|
| cyan pigment (product name: FUJI SP BLUE 6403; produced by FUJI SHIKISO Co.) | 5% |
| glycerol | 10% |
| diethyleneglycol monobutylether | 10% |
| organic silicon compound (A) | 5% |
| $Al(AcAc)_3$ | 0.5% (10%) |
| pure water | 69.5% |

For comparison, 2 types of ink having the following compositions (not containing a gelation suppressant) were prepared (Comparative Examples 1 and 2). (It should be noted that the contents of the constituents of each composition are shown in percentage by mass.)

None of the ink of Comparative Examples 1 and 2 contains a penetrant. Comparative Example 1 employed organic silicon compound (A) which were also used in the above examples. In Comparative Example 2, another organic silicon compound prepared according to the following method (hereinafter, "organic silicon compound (B)") was used. First, 49 g (0.66 mol) of 2,3-epoxy-1-propanol was added to 100 g (0.56 mol) of $H_2NCH_2CH_2CH_2Si(OCH_3)_3$ contained in a reactor in a drop-by-drop fashion. After all of 2,3-epoxy-1-propanol was dropped, the resultant mixture in the reactor was stirred for 5 hours at 80° C., whereby hydrolytic silane which was a reaction product of an amino group and an epoxy group was obtained. Then, a mixture of 120 g (6.67 mol) of water, 50.6 g (0.2 mol) of the obtained hydrolytic silane and 30.4 g (0.2 mol) of $Si(OCH_3)_4$ was supplied into a new reactor in a drop-by-drop fashion. After all of the mixture was dropped, the mixture in the reactor was subjected to a reaction for one hour at 60° C., whereby organic silicon compound (B) for Comparative Example 2 was obtained.

| | |
|---|---|
| (Comparative Example 1) | |
| C.I. acid black 2 | 5% |
| glycerol | 10% |
| organic silicon compound (A) | 5% |
| pure water | 80% |
| (Comparative Example 2) | |
| C.I. acid black 2 | 5% |
| glycerol | 10% |
| organic silicon compound (B) | 5% |
| pure water | 80% |

The ink of Examples 1–28 and Comparative Examples 1 and 2 were left in a 70° C. atmosphere for 3 months, and then, the conditions of the ink were observed. On the other hand, the viscosity of the ink was measured before and after the 3-month period.

As a result, in each of the ink of Comparative Examples 1 and 2, the viscosity of the ink increased, and a small number of precipitates were observed in the ink. In each of the ink of Examples 1–28, the viscosity of the ink did not change except for Example 11 where the content of the gelation suppressant is very small, and no aggregate/precipitate was observed in the ink. Although the viscosity of the ink of Example 11 increased, the increase of the viscosity in Example 11 was smaller than that exhibited in each of the ink of Comparative Examples 1 and 2, and the amount of precipitates observed in Example 11 was small. It is thus understood that, by adding a gelation suppressant to ink, gelation of the silane compound in the ink can be suppressed and the ink can be stabilized over a long time period. It should be noted, however, that if the content of the gelation suppressant is too small (e.g., Example 11), the stabilizing effect of the gelation suppressant cannot be sufficiently obtained. Thus, in view of stability, it is preferable to set the lower limit of the content of the gelation suppressant to 0.1% by mass with respect to the content of the silane compound. In order to more surely obtain the stabilizing effect, the lower limit of the content of the gelation suppressant is preferably set to 0.5% by mass.

Each of the ink of Examples 1–28 and Comparative Examples 1 and 2 was used to form an image on plain paper (product name: Xerox4024; produced by Xerox Co.) with a commercially-available printer (which ejects ink using a piezoelectric actuator similar to that used in the recording apparatus A (except that the thickness of the piezoelectric element used herein is considerably greater than that of the recording apparatus A)). The paper on which the image was formed was soaked in pure water immediately after the formation of the image and then dried at room temperature to examine whether or not a bleeding was generated in the image.

In the image formed with each of the ink of Comparative Examples 1 and 2, a bleeding was found at an edge portion of the image. On the other hand, no bleeding was found in the image formed with each of the ink of the Examples 1–28 except for Examples 11, 19, and 20. Although a bleeding was found in the image recorded with each of the ink of Examples 11, 19, and 20, the degree of bleeding was smaller than that found in the images of Comparative Examples 1 and 2. It is thus understood that even after a long ink-preservation period, high water-resistivity is obtained so long as gelation of the silane compound is suppressed by a gelation suppressant. It should be noted, however, that if the content of the gelation suppressant is too small (e.g., Example 11), the stabilizing effect of the gelation suppressant cannot be sufficiently obtained as described above, and accordingly, the water-resistivity slightly deteriorates. If the content of the gelation suppressant is too large (e.g., Examples 19 and 20), when an ink drop is adhered onto paper and water contained in the ink drop evaporates or permeates into the paper, condensation-polymerization of the silane compound is readily inhibited, and as a result, the water-resistivity may slightly deteriorates. Considering that the water-resistivity should be maintained at a highest possible level, the content of the gelation suppressant is preferably set to 0.1–30% by mass with respect to the content of the silane compound. Considering that high water-resistivity should be obtained more surely, the content of the gelation suppressant is preferably set to 0.5–20% by mass with respect to the content of the silane compound.

Embodiment 2

As in embodiment 1, the ink of embodiment 2 contains a colorant, a humectant for suppressing drying of the ink in the nozzle 14 of the inkjet head 1, or the like, a penetrant for enhancing the permeability of the ink (solvent) into the recording paper 41, water, and a hydrolyzable silane compound employed as a water-soluble substance that is condensation-polymerized in the absence of the water. However, the ink of embodiment 2 does not contain a gelation suppressant. In embodiment 2, gelation of the ink is suppressed by setting the pH value of the ink to 8–12 instead of using a gelation suppressant. It should be noted that a gelation suppressant may be contained in the ink while the pH value of the ink is set to 8–12.

Specific examples of the colorant, the humectant, the penetrant and the silane compound employed in embodiment 2 are the same as those shown in embodiment 1. It is preferable to set the content of the penetrant to 1–50% by mass with respect to the total amount of the ink.

The reasons why the pH value of the ink is set to 8–12 are now described. If the pH value of the ink is smaller than 8, the ink absorbs carbon dioxide to become acidic while the ink is preserved for a long time. As a result, the silane compound readily turns into a gel in water by condensation-polymerization, or the like. Further, if the colorant is an acid dye, the colorant is precipitated. If the pH value of the ink is greater than 12, the pressure chamber member 6, the ink passage member 7, and the nozzle plate 9, or the like, of the head body 2 of the inkjet head 1 of the recording apparatus A are corroded or degraded.

The pH value of the ink is set to 8–12 desirably by adding an inorganic alkali or an organic base. This is an easy way to set the pH value of the ink to 8–12. Further, more preferably, a buffer solution having a buffering effect (an effect of maintaining the hydrogen ion concentration to be generally stable even when a certain amount of acid or base is added or removed) is prepared by a combination of an alkali and a base and added to the ink. In this case, the pH value of the ink does not change even when the ink absorbs carbon dioxide. Examples of the combination of an alkali and a base for preparing such a buffer solution include a combination of sodium hydroxide and sodium dihydrogen phosphate, a combination of sodium hydroxide and sodium hydrogen carbonate, a combination of sodium hydroxide and potassium chloride (to which a boric acid is further added), and the like.

Specific examples of the inorganic alkali include ammonium, sodium hydroxide, sodium carbonate, sodium hydrogen carbonate, trisodium phosphate, disodium hydrogen phosphate, tripotassium phosphate, dipotassium hydrogen phosphate, and the like. The inorganic alkali may be solely contained in the ink or may be contained in the ink together with another inorganic substance.

Specific examples of the organic base include methylamine, ethylamine, dimethylamine, diethylamine, pyrrolidine, trimethylamine, triethylamine, and the like. One of these organic bases may be solely contained in the ink. Alternatively, two or more types of these organic bases may be contained in the ink.

As described above, according to embodiment 2, ink for inkjet recording contains a colorant, a humectant, a penetrant, water, and a water-soluble substance that is condensation-polymerized in the absence of the water, and the pH value of this ink is set to 8–12. Thus, the ink is prevented from becoming acidic after the ink is preserved for a long time, while corrosion and degradation of the pressure chamber member 6, the ink passage member 7, and the nozzle plate 9, or the like, are suppressed. Accordingly, gelation of the ink is suppressed. As a result, ejection failure of ink drops does not occur even when the ink is used after being preserved for a long time to form an image on the recording paper 41 with the recording apparatus A, or even when the recording apparatus A is used after a long unused period during which the pressure chamber 4 and the ink supply passage 11 of the head body 2 of the inkjet head 1 of the recording apparatus A are left filled with the ink. Further, when an ink drop is adhered onto the recording paper 41 and water contained in the ink drop evaporates or permeates into the recording paper 41, condensation-polymerization of the silane compound is sufficiently performed so that the silane compound surely encloses the colorant. Thus, deterioration of the image quality can be suppressed and the water-resistivity of the image can be maintained at a high level over a long time period.

Also in embodiment 2, the water-soluble substance that is condensation-polymerized in the absence of water is not limited to a hydrolyzable silane compound. Any type of substance may be used so long as the substance is condensation-polymerized to enclose a colorant when a water content (solvent) of an ink drop which is ejected from the nozzle 14 of the inkjet head 1 and adhered onto the recording paper 41 evaporates or permeates into the recording paper 41.

Now, specific examples of the ink of embodiment 2 are described.

First, 16 types of ink for inkjet recording, which have the following compositions, were prepared (Examples 1–16). (It should be noted that the contents of the constituents of each composition are shown in percentage by mass.) In each of Examples 1–16, the pH value of the ink was adjusted to 8–12 by adding an inorganic alkali or organic base. (In each of Examples 2–4 and 12, a buffer solution was prepared.)

In all of Examples 1–16, glycerol is used as the humectant, and diethyleneglycol monobutylether is used as the penetrant. Further, an organic silicon compound is used as the hydrolyzable silane compound. The organic silicon compound used herein was organic silicon compound (A).

In each of Examples 1–11, a dye is contained as the colorant. In each of Examples 12–16, a pigment is contained as the colorant.

EXAMPLE 1

| | |
|---|---|
| C.I. acid black 2 | 5% |
| glycerol | 10% |
| diethyleneglycol monobutylether | 10% |
| organic silicon compound (A) | 5% |
| sodium hydroxide | 0.1% |
| pure water | 69.9% |
| pH = 12 | |

EXAMPLE 2

| | |
|---|---|
| C.I. acid black 2 | 5% |
| glycerol | 10% |
| diethyleneglycol monobutylether | 10% |
| organic silicon compound (A) | 5% |
| sodium hydroxide | 0.2% |
| potassium dihydrogen phosphate | 0.7% |
| pure water | 69.1% |
| pH = 8 | |

EXAMPLE 3

| | |
|---|---|
| C.I. acid black 2 | 5% |
| glycerol | 10% |
| diethyleneglycol monobutylether | 10% |
| organic silicon compound (A) | 5% |
| sodium hydroxide | 0.1% |
| boric acid | 0.6% |
| potassium chloride | 0.7% |
| pure water | 68.6% |
| pH = 9.5 | |

EXAMPLE 4

| | |
|---|---|
| C.I. acid black 2 | 5% |
| glycerol | 10% |
| diethyleneglycol monobutylether | 10% |
| organic silicon compound (A) | 5% |
| sodium hydroxide | 0.1% |
| sodium hydrogen carbonate | 0.2% |
| pure water | 69.7% |
| pH = 10.9 | |

EXAMPLE 5

| | |
|---|---|
| C.I. acid black 2 | 5% |
| glycerol | 10% |
| diethyleneglycol monobutylether | 10% |
| organic silicon compound (A) | 5% |
| methylamine | 0.5% |
| pure water | 69.5% |
| pH = 9.8 | |

EXAMPLE 6

| | |
|---|---|
| C.I. acid black 2 | 5% |
| glycerol | 10% |
| diethyleneglycol monobutylether | 10% |
| organic silicon compound (A) | 5% |
| dimethylamine | 0.5% |
| pure water | 69.5% |
| pH = 9.7 | |

EXAMPLE 7

| | |
|---|---|
| C.I. acid black 2 | 5% |
| glycerol | 10% |
| diethyleneglycol monobutylether | 10% |
| organic silicon compound (A) | 5% |
| pyrrolidone | 0.5% |
| pure water | 69.5% |
| pH = 9.7 | |

EXAMPLE 8

| | |
|---|---|
| C.I. acid black 2 | 5% |
| glycerol | 10% |
| diethyleneglycol monobutylether | 10% |
| organic silicon compound (A) | 5% |
| ammonium | 0.5% |
| pure water | 69.5% |
| pH = 9.5 | |

EXAMPLE 9

| | |
|---|---|
| C.I. acid yellow 23 | 5% |
| glycerol | 10% |
| diethyleneglycol monobutylether | 10% |
| organic silicon compound (A) | 5% |
| ammonium | 0.5% |
| pure water | 69.5% |
| pH = 9.9 | |

EXAMPLE 10

| | |
|---|---|
| C.I. acid red 52 | 5% |
| glycerol | 10% |
| diethyleneglycol monobutylether | 10% |
| organic silicon compound (A) | 5% |
| ammonium | 0.5% |
| pure water | 69.5% |
| pH = 9.8 | |

EXAMPLE 11

| | |
|---|---|
| C.I. direct blue 86 | 5% |
| glycerol | 10% |
| diethyleneglycol monobutylether | 10% |
| organic silicon compound (A) | 5% |

-continued

| | |
|---|---|
| ammonium | 0.5% |
| pure water | 69.5% |
| pH = 9.5 | |

EXAMPLE 12

| | |
|---|---|
| carbon black (product name: CAB-O-JETTM-200; produced by Cabot Co.) | 5% |
| glycerol | 10% |
| diethyleneglycol monobutylether | 10% |
| organic silicon compound (A) | 5% |
| sodium hydroxide | 0.1% |
| boric acid | 0.6% |
| potassium chloride | 0.7% |
| pure water | 68.6% |
| pH = 9.5 | |

EXAMPLE 13

| | |
|---|---|
| carbon black (product name: CAB-O-JETTM-300; produced by Cabot Co.) | 5% |
| glycerol | 10% |
| diethyleneglycol monobutylether | 10% |
| organic silicon compound (A) | 5% |
| sodium hydroxide | 0.1% |
| boric acid | 0.6% |
| potassium chloride | 0.7% |
| pure water | 68.6% |
| pH = 9.5 | |

EXAMPLE 14

| | |
|---|---|
| yellow pigment (product name: FUJI SP YELLOW 4223; produced by FUJI SHIKISO Co.) | 5% |
| glycerol | 10% |
| diethyleneglycol monobutylether | 10% |
| organic silicon compound (A) | 5% |
| sodium hydroxide | 0.1% |
| boric acid | 0.6% |
| potassium chloride | 0.7% |
| pure water | 68.6% |
| pH = 9.5 | |

EXAMPLE 15

| | |
|---|---|
| magenta pigment (product name: FUJI SP MAGENTA 9338; produced by FUJI SHIKISO Co.) | 5% |
| glycerol | 10% |
| diethyleneglycol monobutylether | 10% |
| organic silicon compound (A) | 5% |
| sodium hydroxide | 0.1% |
| boric acid | 0.6% |
| potassium chloride | 0.7% |
| pure water | 68.6% |
| pH = 9.5 | |

EXAMPLE 16

| | |
|---|---|
| cyan pigment (product name: FUJI SP BLUE 6403; produced by FUJI SHIKISO Co.) . | 5% |
| glycerol | 10% |
| diethyleneglycol monobutylether | 10% |
| organic silicon compound (A) | 5% |
| sodium hydroxide | 0.1% |
| boric acid | 0.6% |
| potassium chloride | 0.7% |
| pure water | 68.6% |
| pH = 9.5 | |

For comparison, 2 types of ink having the following compositions (which do not contain an inorganic alkali or organic base) were prepared (Comparative Examples 1 and 2). (It should be noted that the contents of the constituents of each composition are shown in percentage by mass.)

None of the ink of Comparative Examples 1 and 2 contains a penetrant. Comparative Example 1 employed organic silicon compound (A), whereas Comparative Example 2 employed organic silicon compound (B).

| | |
|---|---|
| (Comparative Example 1) | |
| C.I. acid black 2 | 5% |
| glycerol | 10% |
| organic silicon compound (A) | 5% |
| pure water | 80% |
| pH = 7.2 | |
| (Comparative Example 2) | |
| C.I. acid black 2 | 5% |
| glycerol | 10% |
| organic silicon compound (B) | 5% |
| pure water | 80% |
| pH = 7.1 | |

The ink of Examples 1–16 and Comparative Examples 1 and 2 were left in a 70° C. atmosphere for 3 months, and then, the conditions of the ink were observed. On the other hand, the viscosity of the ink was measured before and after the 3-month period.

In each of the ink of Comparative Examples 1 and 2, the viscosity of the ink was increased (the viscosity of the ink began to increase after about one month elapsed). Further, a small number of precipitates were observed in the ink. In each of the ink of Examples 1–28, on the other hand, the viscosity of the ink did not change, and no aggregate/precipitate was observed in the ink. It is thus understood that, by initially setting the pH value of the ink to 8–12, gelation of the silane compound can be suppressed and the ink can be stabilized over a long time period.

Each of the ink of Examples 1–16 and Comparative Examples 1 and 2 was used to form an image on plain paper (product name: Xerox4024; produced by Xerox Co.) with a commercially-available printer (which ejects ink using a piezoelectric actuator similar to that used in the recording apparatus A (except that the thickness of the piezoelectric element used herein is considerably greater than that of the recording apparatus A)). The paper on which the image was formed was soaked in pure water and then dried at room temperature to examine whether or not a bleeding was generated in the image.

As a result, in the image formed with each of the ink of Comparative Examples 1 and 2, a bleeding was found in an edge portion of the image. On the other hand, no bleeding was found in the image formed with each ink of Examples 1–16. It is thus understood that high water-resistivity is obtained even after the ink is preserved for a long time so long as gelation of the silane compound is suppressed by setting the pH value of the ink to 8–12.

INDUSTRIAL APPLICABILITY

The present invention is useful for ink for inkjet recording which is employed for recording with an inkjet-type recording apparatus. The present invention possesses high industrial applicability in respect that, even when the ink is used for recording after being preserved for a long time, the water-resistivity of an image formed with the ink can be maintained at a high level while deterioration of the quality of the image can be suppressed.

What is claimed is:

1. Ink for inkjet recording, comprising a colorant, a humectant, a penetrant, water, and a water-soluble substance that is condensation-polymerized in the absence of the water, wherein the ink further contains a gelation suppressant for suppressing gelation of the water-soluble substance in the water, wherein the gelation suppressant is acetylacetone or a derivative thereof, and wherein the acetylacetone derivative is an acetylacetonato complex or an acetylacetone derivative having a symmetry plane.

2. Ink for inkjet recording according to claim 1, wherein the water-soluble substance is a hydrolyzable silane compound.

3. Ink for inkjet recording according to claim 2, wherein the content of the gelation suppressant is set to 0.1–30% by mass with respect to the content of the hydrolyzable silane compound.

4. A cartridge including ink for inkjet recording, the ink containing a colorant, a humectant, a penetrant, water, and a water-soluble substance that is condensation-polymerized in the absence of the water, wherein the ink further contains a gelation suppressant for suppressing gelation of the water-soluble substance in the water, wherein the gelation suppressant is acetylacetone or a derivative thereof, and wherein the acetylacetone derivative is an acetylacetonato complex or an acetylacetone derivative having a symmetry plane.

5. A recording apparatus including ink for inkjet recording, the ink containing a colorant, a humectant, a penetrant, water, and a water-soluble substance that is condensation-polymerized in the absence of the water, and the recording apparatus ejecting the ink toward a recording medium for recording, wherein the ink further contains a gelation suppressant for suppressing gelation of the water-soluble substance in the water, wherein the gelation suppressant is acetylacetone or a derivative thereof, and wherein the acetylacetone derivative is an acetylacetonato complex or an acetylacetone derivative having a symmetry plane.

6. Ink for inkjet recording, comprising a colorant, a humectant, a penetrant, water, and a water-soluble substance that is condensation-polymerized in the absence of the water, wherein the ink further contains a gelation suppressant for suppressing gelation of the water-soluble substance in the water, wherein the gelation suppressant is acetylacetone or a derivative thereof, and wherein the acetylacetone derivative is an acetylacetonato complex or an acetylacetone derivative having a symmetry plane, wherein the acetylacetonate complex is $Al(AcAc)_3$, or $Zr(AcAc)_4$.

7. Ink for inkjet recording, comprising a colorant, a humectant, a penetrant, water, and a water-soluble substance that is condensation-polymerized in the absence of the water, wherein the ink further contains a gelation suppressant for suppressing gelation of the water-soluble substance in the water, wherein the gelation suppressant is acetylacetone or a derivative thereof, and wherein the acetylacetone derivative is an acetylacetonato complex or an acetylacetone derivative having a symmetry plane, wherein the acetylacetone derivative is 3-methylpentane-2, 4-dione, heptane-3, 5-dione, 4-methylheptane-3, 5-dione, dimethylester malonate, 2-dimethylester methylmalonate, diethylester malonate, or 2-diethylester methylmalonate.

* * * * *